Nov. 10, 1936.   C. E. WHIPPLE   2,060,153
FRUIT SORTING APPARATUS AND METHOD
Filed Feb. 23, 1934   2 Sheets-Sheet 1
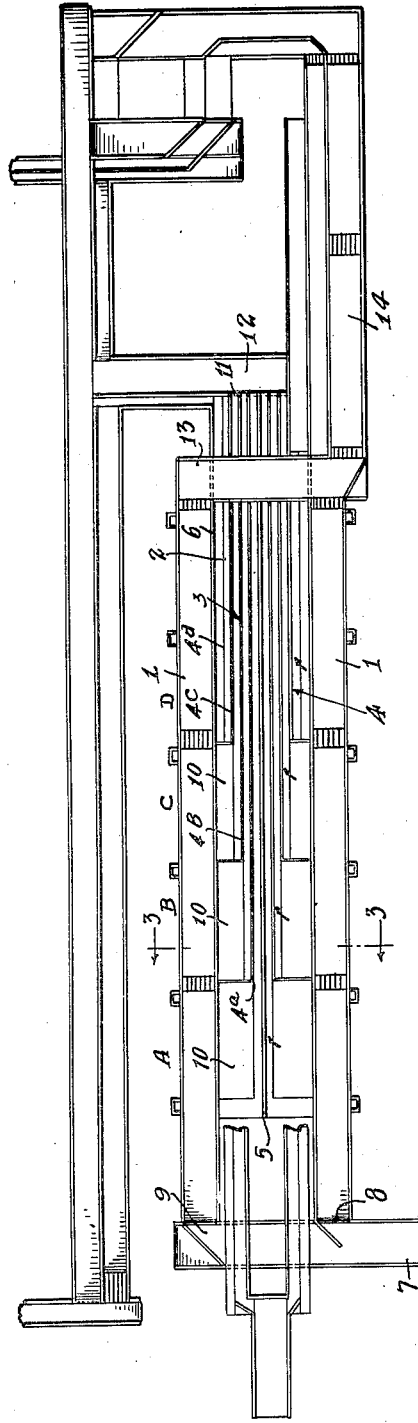
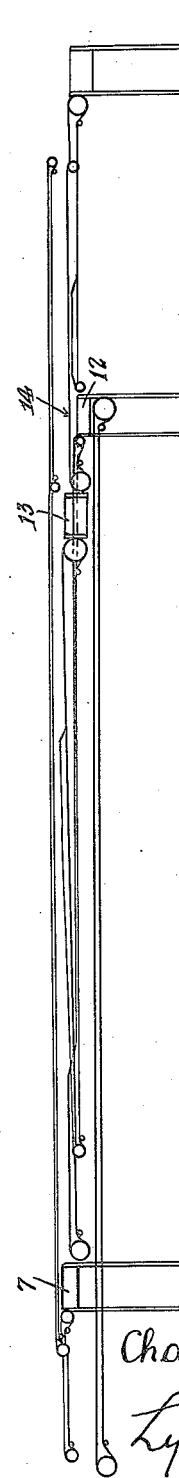
Inventor
Charles E. Whipple
Lyon & Lyon
Attorney

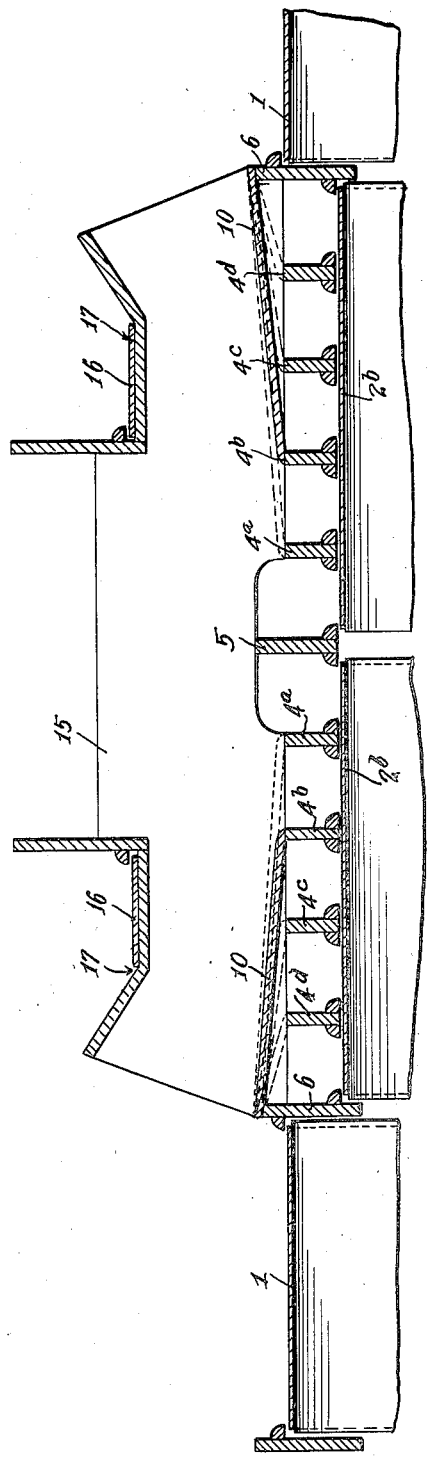

Patented Nov. 10, 1936

2,060,153

UNITED STATES PATENT OFFICE 2,060,153

FRUIT SORTING APPARATUS AND METHOD

Charles E. Whipple, Santa Paula, Calif.

Application February 23, 1934, Serial No. 712,479

7 Claims. (Cl. 209—125)

This invention relates to the sorting of articles, for example fruit or the like. In sorting fruit for quality, it is the present practice to have a number of sorting stations at which individual sorters are located, and as the fruit passes these sorting stations, the different sorters select out the imperfect fruit. This selected fruit is placed on a conveyor and delivered for packing. It is customary for a superintendent or observer to observe the selected fruit before it passes to the packing station. If it is found that some of the fruit passing to the packing station is not of required quality, the observer or superintendent has no means of knowing which one of the sorters is at fault. For example, if the observer finds that some of the fruit is below standard quality, he may admonish all of the sorters to be more careful in their sorting operation. If he does this, the sorters who are already properly selecting the fruit that passes their station, may raise their standard and commence to reject fruit that they should select as sufficiently perfect. For this reason this method of sorting fruit is objectionable.

The general object of this invention is to provide a method and apparatus which will overcome this difficulty, and which will enable the superintendent or observer to examine the fruit selected by each sorter before it finally passes to the packing station.

A further object of the invention is to provide a compact sorting apparatus having means for maintaining the selected fruit from the different sorters in a segregated condition; and to provide compact guideways corresponding to the fruit selected by each sorter; also to provide means for facilitating the operations of the different sorters in placing the fruit selected by each sorter in his corresponding guideway.

Further objects of the invention will appear hereinafter.

As regards the apparatus, the invention consists in the novel parts and combination of parts to be described hereinafter, all of which contribute to produce an efficient sorting apparatus.

The invention also resides in the method, and consists in the combination of acts described hereinafter, all of which contribute to produce an efficient method for sorting fruit.

In the drawings:

Figure 1 is a plan with certain parts broken away, of a sorting apparatus embodying my invention, and by means of which my method can be readily practiced.

Figure 2 is a side elevation illustrating the belt arrangement shown in Fig. 1. This view is diagrammatical in its nature, and does not show the superstructure of the apparatus.

Figure 3 is an elevational cross section through the apparatus, taken about on the line 3—3 of Fig. 1, but including the superstructure carrying the cull belts that may be employed with my apparatus for carrying off the culls.

Before proceeding to a more detailed description of the invention, it should be stated that in accordance with my method, I advance the fruit to be sorted past a plurality of individual sorting stations occupied by different operators who sort the fruit; the fruit selected by each sorter is segregated from the rest of the selected fruit, and all of the selected fruit is advanced past an observer's station while in the segregated condition, so that the observer can observe the characteristics of the fruit selected by each sorter. As a result of this method, if the observer finds that the fruit selected by any particular sorter is above or below the standard of quality, he can further instruct this particular sorter in his duties.

The apparatus for carrying out this method, preferably includes means for advancing the unsorted fruit past a plurality of sorting stations at which the individual operators are located, who sort the fruit. The apparatus preferably includes a plurality of different guideways, that is to say, there is a guideway corresponding to each operator, and into which this operator places the fruit selected by him. In the preferred form of the apparatus, the selected fruit is carried forward on a conveyor or belt, and the characteristics of the fruit in the different guideways can be observed by the observer who is preferably located at an observer's station past which all of the fruit passes.

The apparatus illustrated in the drawings is of duplex form, that is to say, it provides two sets of sorters' stations located opposite to each other, and between them the fruit to be sorted, passes. Of course, if desired, a single set of sorting stations can be employed to cooperate with a single type of apparatus in which there would be a single conveyor or belt carrying the fruit to be sorted, past the sorting stations.

Referring more particularly to the parts, I prefer to provide conveyor means preferably consisting of two conveyors 1, 1, which may be in the form of two parallel conveyor means or belts spaced apart so as to enable a conveyor, or belts 2 to be placed between them. Along the outer edge of each belt 1, a plurality of sorting stations are provided, indicated by the location of the letters A, B, C and D. The space between the sorting belts is divided into a plurality of guideways or runways indicated generally by the number 3. These guideways are preferably formed by providing longitudinal rails 4, which extend longitudinally over the belt means or belt 2. At the center between belts 2, the main dividing rail 5 is placed. The innermost intermediate rails 4a extend up to a point near the sorting station A. A rail 4b extends up to each sorting station B, and a similar rail 4c extends up to the sorting station C. A rail 4d extends past the sorting station D, and an outside rail 6 cooperates with the rail 4c to maintain fruit on the outer edge of each belt 2, that is selected by the sorter at the stations D.

Suitable means such as a lateral conveyor 7 is provided for delivering the fruit to be sorted through gates 8 and 9 to the two sorting belts 1, 1.

The operators who sort the fruit, and who are referred to herein as "sorters", may sit or stand adjacent the sorting belts 1, at their respective stations. Each sorter selects fruit passing on the sorting belt, and places it in his corresponding guideway on the sorting table or belt 2. In order to facilitate this, I prefer to provide a bridge 10 corresponding to each sorting station, and these bridges are of progressive width, the widest bridge being located opposite the station A, which is the first station reached by the fruit in passing down the table. This board extends over in a substantially horizontal or slightly inclined position (see Fig. 3), so that its inner edge is about in alignment with the guide rail 4a.

The different guide rails keep the fruit selected by the different sorters segregated. The observer who observes the selected and segregated fruit, may be located at any convenient point in the path of the selected fruit. I prefer, however, to provide a common delivery point for all the selected fruit, which is located at the point 11 where a lateral receiving belt 12 is provided, that receives the selected fruit and carries it off for delivery to a packing station, or to washers or any other apparatus or tables used in completing the packing operation.

The fruit that is not selected by the sorters, is delivered to a cross belt 13 that is driven in the direction of the arrow indicated in Fig. 1, and this cross belt delivers to the conveyor 14 that conveys the unselected fruit around to any point where it is to be delivered.

In Fig. 3 I illustrate the general construction of the apparatus in cross section. In this view, the conveyor belt 2 is illustrated as consisting of two separate belts 2. In small sorting apparatus the same belt can be employed, if desired, instead of two separate belts.

Fig. 3 illustrates superstructure 15 for the apparatus, which may be used, if desired, to support and guide the cull belts 16, which run in troughs 17 past the sorting stations. The use of these cull belts enables the sorters to cull the fruit at the same time that they are selecting the fruit that is up to standard for sale as first quality fruit. These cull belts deliver to a lateral belt (not illustrated) at the delivery end of the machine.

It is understood that the embodiment of the invention described herein is only one of the many embodiments this invention may take, and I do not wish to be limited in the practice of the invention, nor in the claims, to the particular embodiment set forth.

What I claim is:—

1. In sorting apparatus for sorting fruit and the like, the combination of a conveyor for advancing the unsorted fruit, a number of sorting stations for individual fruit sorters respectively, disposed side by side along the conveyor, a second conveyor extending longitudinally with the first-named conveyor, longitudinally disposed guide rails disposed over the second conveyor and dividing the same into the same number of guideways as there are sorting stations, and substantially horizontal bridge means associated with each sorting station for covering the guideways adjacent to the sorting station and corresponding to other sorters, to facilitate the placing of the fruit selected at that station into its proper guideway.

2. In sorting apparatus for sorting fruit and the like, the combination of a conveyor for advancing the unsorted fruit, a number of sorting stations for individual operators who sort the fruit, a second conveyor extending longitudinally with the first-named conveyor, longitudinally disposed guide rails disposed over the second conveyor and dividing the same into the same number of guideways as there are sorting stations, substantially horizontal bridge means associated with each sorting station covering the guideways adjacent to the sorting station and corresponding to other sorters, to facilitate the placing of the fruit selected at that station into its corresponding guideways, and an observer's station to be occupied by an operator for observing the fruit selected by each individual sorter and past which all of the selected fruit moves.

3. The method of sorting fruit or the like, which consists in advancing all of the fruit to the first of a plurality of sorting stations, sorting a portion of said fruit at said first station, and advancing the remainder of the unsorted fruit to the second sorting station, sorting a portion of the fruit at said second station, and continuing the sorting operation at the remaining stations in succession, maintaining the fruit selected by each sorter segregated from the rest of the selected fruit, and advancing all of the selected fruit in its segregated state past an observer's station so that the observer can individually observe the characteristics of the fruit selected by the different sorters.

4. In sorting apparatus for sorting fruit and the like as to quality only, the combination of a conveyor for advancing the unsorted fruit past a plurality of sorting stations for individual fruit sorters who sort the fruit, a conveyor for advancing selected fruit and extending longitudinally with the first-named conveyor, guides extending longitudinally of the last-named conveyor and dividing the same into a plurality of guideways, said sorting stations being located in a row alongside of said conveyor, each guideway for the exclusive use of one sorter and enabling each sorter to segregate the fruit selected by him, in his corresponding guideway, an observer's station to be occupied by an observer and located adjacent the second-named conveyor, said last-named conveyor operating to move the fruit segregated by each sorter, past the observer's station in its segregated condition to enable the observer to compare the fruit selected by any sorter with the fruit selected by the other sorters.

5. The method of sorting fruit or the like, which consists in advancing all of the fruit to the first of a plurality of sorting stations, sorting a portion of said fruit at said first station, and advancing the remainder of the unsorted fruit to the second sorting station, sorting a portion of the fruit at said second station, and continuing the sorting operation at the remaining stations in succession, maintaining the fruit selectively of each sorter segregated from that of the other sorters, and advancing all of the selected fruit so segregated past an observer's station in a manner to enable the observer to supervise and control the work done by each individual sorter.

6. In an apparatus for sorting fruit and the like, the combination of conveyor means or channels for advancing the fruit in one or more streams or channels for sorting, a number of sorting stations, each station corresponding to an individual operator sorter who sorts the fruit at his station, a second conveyor or channel extending longitudinally with the first-named conveyor means, longitudinally disposed guiding means disposed over the second conveyor or channel and dividing the same into channels corresponding in number with the number of sorting stations, means for definitely closing said corresponding sorter's channels to sorters other than those definitely devoted to the individual sorter's stations, and a supervisor's station for supervising the fruit selections of each individual sorter.

7. In sorting apparatus for rollable articles, the combination of a conveyor for advancing the articles past a plurality of sorting stations for individual sorters, a conveyor for advancing the selected articles and extending longitudinally with the first-named conveyor, guiding means extending longitudinally over the last-named conveyor for creating thereon a plurality of definite channels, said sorting stations being progressively located adjacent the first-named conveyor means on said channels adjacent each sorting station for preventing the entry of articles deposited by a sorter at said station, into a channel other than such definite channel on said second conveyor as is contiguous to each individual sorter, a supervisory station subsequent to the second named conveyor, whereby the segregated articles from each sorter may separately pass the supervisory station for inspection.

CHARLES E. WHIPPLE.